(12) United States Patent
Futschik et al.

(10) Patent No.: US 6,532,682 B2
(45) Date of Patent: Mar. 18, 2003

(54) VENTILATED FOOT REST FOR A MOTOR VEHICLE

(75) Inventors: Hans-Dieter Futschik, Gechingen (DE); Peter Pfeiffer, Böblingen (DE); Norbert Weber, Bondorf (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/987,443

(22) Filed: Nov. 14, 2001

(65) Prior Publication Data

US 2002/0058472 A1 May 16, 2002

(30) Foreign Application Priority Data

Nov. 14, 2000 (DE) .......................................... 100 56 414

(51) Int. Cl.[7] ................................................ F26B 19/00
(52) U.S. Cl. ............................... 34/239; 34/82; 34/202; 454/144; 454/158; 454/370
(58) Field of Search ................................. 454/144, 152, 454/156, 158, 370; 34/82, 202, 239; 219/368; 392/380, 382, 383

(56) References Cited

U.S. PATENT DOCUMENTS

| 2,267,158 | A | * | 12/1941 | Locke |
| 3,284,836 | A | * | 11/1966 | Ioppolo |
| 3,378,009 | A | * | 4/1968 | Piplin |
| 3,939,825 | A | * | 2/1976 | Krummenacher ........ 15/104.92 |
| 4,782,601 | A | * | 11/1988 | Gonzalez .................... 219/217 |
| 5,491,908 | A | * | 2/1996 | Ruiz et al. .................... 34/202 |
| 5,501,682 | A | * | 3/1996 | Edwards-Cofie ........... 132/73.5 |
| 5,826,347 | A | * | 10/1998 | Olivares-Gonzalez de Serrano et al. .............................. 34/202 |

FOREIGN PATENT DOCUMENTS

| DE | 1749349/630 (90) | 7/1957 |
| DE | 1786328/630 (91) | 4/1959 |
| DE | 3114295 A1 | 9/1982 |

* cited by examiner

Primary Examiner—Harold Joyce
(74) Attorney, Agent, or Firm—Crowell & Moring LLP

(57) ABSTRACT

A ventilated foot rest for a motor vehicle, in particular for a passenger vehicle, has a housing which contains at least one air-inlet opening and at least one air-outlet opening, and which has a foot-depositing board on its upper side. In order to better utilize this foot rest, it is proposed to form a storage space and at least two flow paths which are independent of each other in the housing. A first flow path ventilates the storage space, while a second flow path bypasses the storage space and ventilates the foot-depositing board.

30 Claims, 2 Drawing Sheets

VENTILATED FOOT REST FOR A MOTOR VEHICLE

This application claims the priority of German application 100 56 414.3, filed Nov. 14, 2000.

BACKGROUND AND SUMMARY OF THE INVENTION

The present invention relates to a ventilated foot rest for a motor vehicle, in particular for a passenger vehicle, having a housing which contains at least one air-inlet opening and at least one air-outlet opening, and a foot-depositing board on an upper side of the housing.

One example of a foot rest of this type is disclosed in German publication DE 31 14 295 A1. This foot rest has a wedge-shaped housing which contains an air-inlet opening and a plurality of air-output or outlet openings. The air-inlet opening is connected via an intermediate piece to a duct ending below a motor vehicle seat in order to supply air to the space lying behind the seat. The air-outlet openings are situated at the sides of the housing. A foot-depositing board is formed on the upper side of the housing, and a passenger sitting on the associated rear seat can deposit his feet thereon.

German utility model publication No. 1 786 328/630, (91), likewise, discloses a ventilated foot rest in which a cavity is formed between a foot-depositing board, a bulkhead of the vehicle, and a vehicle floor. The cavity is connected to an air-conditioning device of the vehicle. There are made, in this foot-depositing board, a plurality of air-outlet openings through which the conditioned air can enter into the footwell from the cavity.

German utility model publication No. 1 749 349/630, (90) discloses a container which is wedge-shaped in cross section and has a hinged cover which contains a storage space for accommodating car accessories. This container can be used at the same time as a foot rest.

The present invention is concerned with the problem of providing an advantageous embodiment of a foot rest of the type mentioned at the beginning which has increased utility.

This problem is solved according to the invention by a foot rest having a storage space formed in the housing, and in which at least two flow paths, which are independent of each other, are formed in the housing. A first of these flow paths ventilates the storage space, and a second of these flow paths bypasses the storage space and ventilates the foot-depositing board.

The present invention is based on the general concept of forming ventilating means, independent of one another, for the foot-depositing board and for a storage space formed in the housing. In this way, proper ventilation of the foot-depositing board can be ensured irrespective of the state of loading of the storage space, which results in an increase in comfort.

The foot-depositing board can preferably be formed on a cover of the storage space; a second flow path, which serves for ventilating the foot-depositing board, then at least partly runs in this cover. The storage space is thereby accessible from above.

According to one feature, a common air-intake space can be provided for both flow paths. At least one air-inlet opening opens into the space, and the space contains a separate overflow opening for each flow path. A first overflow opening forms the inlet into the first flow path, and a second overflow opening forms the inlet into the second flow path. A defined inflow to the two flow paths can be obtained by this construction in order to be able to ensure, for example, a certain volume flow for the ventilation of the foot-depositing board.

According to an advantageous feature of the abovementioned embodiment, flap means can be provided and can be used to set the cross section, through which the flow can pass, of the first overflow opening and/or of the second overflow opening. Regulation of the air flows can thereby be achieved. In particular, a switch can be made between ventilating the foot-depositing board and ventilating the storage space. Similarly, it is possible to switch on the storage-space ventilation or to switch on the foot-depositing-board ventilation.

If one of the air-outlet openings is formed in a wall section of the housing, which wall section bounds the storage space, then, an odor filter, such as an activated carbon filter, can be arranged in this air-outlet opening. The storage box may then be used, for example, for accommodating shoes. By ventilating the storage box, the shoes can be dried. Odor arising in association with drying the shoes is trapped in the odor filter.

An air-outlet opening in the foot-depositing board preferably is formed of a multiplicity of small openings which are distributed extensively over the foot-depositing board. In this way, ventilation of the foot-depositing board results in a diffuse air outlet from the foot-depositing board. By appropriate air-conditioning of the fed-in air flow, feet deposited on the foot-depositing board may, for example, be heated and/or dried.

In one embodiment, a fan can be arranged in the air-intake space. The fan sucks in fresh air at the air-inlet opening and feeds it to the overflow openings. An embodiment of this type may, in principle, be used in any footwell of a vehicle.

In an alternative embodiment, the air-inlet opening can be connected to an air discharge of an air-conditioning device of the motor vehicle. Similarly, it is possible to provide an embodiment in which the air-inlet opening has an adapter with which the air-inlet opening can be connected to an air discharge of an air-conditioning device of the motor vehicle. These embodiments can be used in a footwell provided the footwell has a suitable air discharge.

In one embodiment, the foot-depositing board can have electrical heating elements with which, for example, heating of the air-outlet board can be obtained even without ventilation. Similarly, the air flow emerging from the air-outlet board can thereby be heated.

Further important features and advantages of the present invention will be apparent from dependent claims, from the drawings, and from the associated description of the figures with reference to the drawings.

The features which are mentioned above and those which have yet to be explained below can be used not only in the combination indicated in each case, but also in other combinations or on their own without departing from the scope of the present invention.

Preferred embodiments of the invention are illustrated in the drawings and will be explained in greater detail in the following description.

DESCRIPTION OF THE PREFERRED EMBODMENTS

Figure 1:
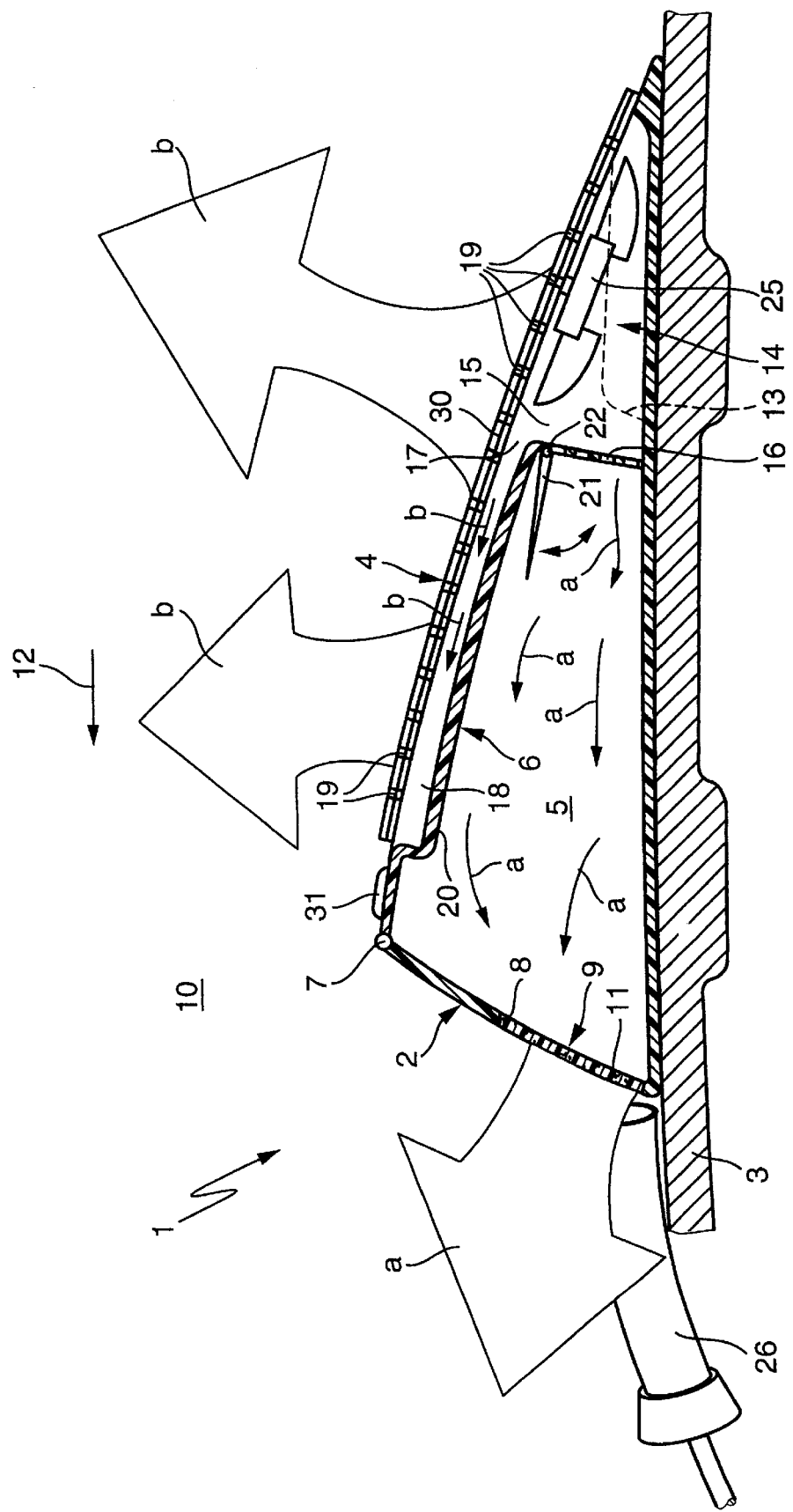
FIG. 1 shows a longitudinal section through a foot rest according to a first embodiment of the invention.
Figure 2:
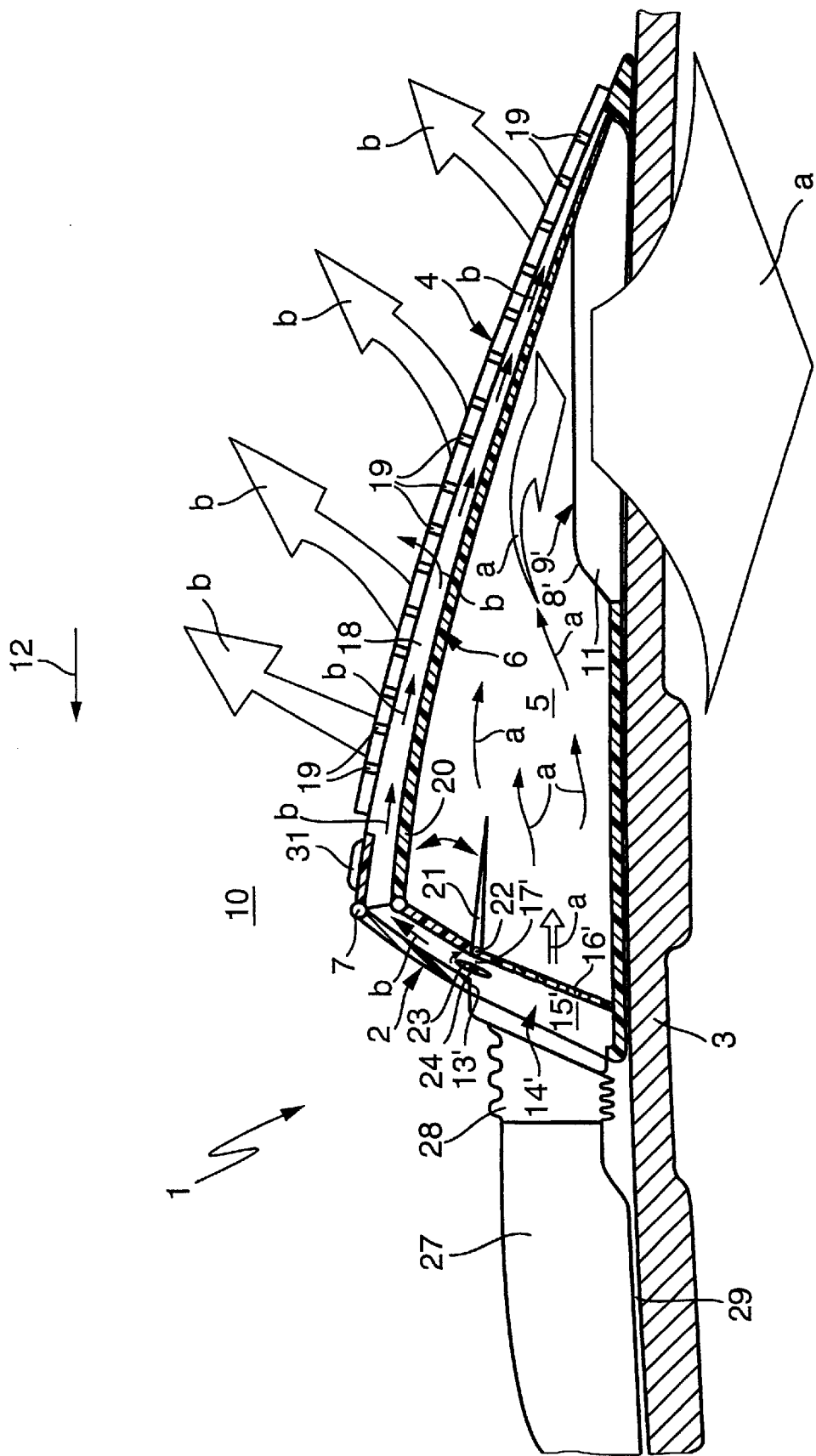
FIG. 2 shows a view similar to FIG. 1, but according to a second embodiment.

Each of FIGS. 1 and 2 shows a foot rest 1 according to the invention which has a housing 2. The housing is, for example, triangular or wedge-shaped in longitudinal section, and is arranged on a floor 3 of a motor vehicle (otherwise not illustrated). The housing 2 has, on its upper side, a foot-depositing board 4 on which a passenger sitting in a vehicle seat assigned to this foot rest 1, for example a front-passenger seat or rear seat, can comfortably place his feet in an ergonomically favorable position. A storage space 5 is formed in the interior of the housing 2 and can be closed on its upper side by a cover 6. This cover 6 is mounted on the housing 2 in a manner such that it can pivot, for example, about a pivot axis 7 running transversely with respect to the longitudinal direction of the foot rest 1. In another embodiment, this pivot axis 7 may, for example, also be arranged on a longitudinal side of the foot rest 1. In FIGS. 1 and 2, the cover 6 is in its closed position. In this closed position, the foot-depositing board 4, which is formed on the upper side of the cover 6, can be used for the passenger to deposit his feet on. In an open position of the cover 6, the latter is pivoted upwards about its pivot axis 7, as a result of which an extensive access option to the storage space 5 is formed.

A first air-outlet opening 9 or 9' is formed in a wall section 8 (cf. FIG. 1) or 8' (cf. FIG. 2) which at least partly bounds the storage space 5. Air can emerge through the opening from the storage space 5 into the surroundings of the foot rest 1, preferably into a footwell 10.

An odor filter 11, which can be formed by an activated carbon filter, is expediently arranged in this first air-outlet opening 9, 9'. While in FIG. 1 the first air-outlet opening 9 is oriented forwards with respect to a direction of travel symbolized by an arrow 12, the first air-outlet opening 9' according to FIG. 2 has a lateral orientation.

An air-inlet opening 14 or 14' is formed in another wall section 13 or 13' of the housing 2, through which opening air can enter into the housing 2. In the variant according to FIG. 1, the air-inlet opening 14 is arranged laterally; in the variant according to FIG. 2, the air inlet opening is arranged at the front of the housing 2. The housing 2 contains an air-intake space 15 or 15' into which the air-inlet opening 14, 14' opens. This air-inlet space 15, 15' has two overflow openings, namely a first overflow opening 16 or 16' and a second overflow opening 17 or 17'. By means of the first overflow opening 16 or 16', the storage space 5, and the first air-outlet opening 9 or 9', there is formed, in the interior of the housing 2, a first flow path, the flow course of which is symbolized in the figures by arrows a. In this case, the first overflow opening 16 or 16' forms the inlet of this first flow path. In a corresponding manner, the second overflow opening 17, 17' forms the inlet of a second flow path, which is likewise formed in the housing 2. The air flow in this second flow path is illustrated symbolically in the figures by arrows b. Accordingly, this second flow path is formed by the second overflow opening 17, 17', by the duct 18 or 18' formed in the interior of the cover 6, and by a multiplicity of openings 19, which penetrate the foot-depositing board 4. In this case, the openings 19 in their entirety form a second air-outlet opening or a second air outlet through which air can emerge from the housing 2 into the surroundings 10. The duct 18 is formed between the foot-depositing board 4, which is formed on the upper side of the cover 6, and a wall 20, which is arranged on the lower side of the cover 6. This duct 18 preferably extends over the entire surface of the foot-depositing board 4, which surface is provided with the openings 19. The second overflow opening 17, 17' forms the inlet of the second flow path.

By means of the first flow path (cf. arrows a) ventilation of the storage space 5 can be realized, in which case odors which may form in the storage space cannot penetrate into the footwell 10 through the odor filter 11 in the first air-outlet opening 9, 9'. In contrast to this, ventilation of the foot-depositing board 4 can be obtained by the second flow path (arrows b). The multiplicity of relatively small openings 19 results in a diffuse air outlet from the foot-depositing board 4.

In the embodiments illustrated here, the first overflow opening 16, 16' is in each case assigned a first flap 21 which can be used to set the cross section, through which the flow can pass, of the first overflow opening 16, 16'. The first flap 21 is mounted on the housing 2 in a manner such that it can pivot, for example, about a pivot axis 22.

In the embodiment according to FIG. 2, a second flap 23 is also provided and it can be used to set the cross section, through which the flow can pass, of the second overflow opening 17'. For this purpose, the second flap is mounted on the housing 2 in a manner such that it can be adjusted by pivoting about a pivot axis 24.

By means of corresponding flap positions, the air entering into the air-intake space 15, 15' can be distributed to the overflow openings 16, 16' and 17, 17'. For example, a switch can then be made alternatively between ventilating the storage space 5 and ventilating the foot-depositing board 4.

According to FIG. 1, the foot rest 1 in a first embodiment can be formed as a more or less autonomous unit which is designed for producing the air flows. For this purpose, a fan 25 is arranged in the air-intake space 15, which fan sucks in fresh air at the air-inlet opening 14 and feeds it to the overflow openings 16 and 17. Depending on the flap position, the air delivered by the fan 25 is then distributed to a greater or lesser extent to the one or other flow path.

The fan 25 has an electric drive. For this reason the housing 2 has electrical connection means 26 designed, for example, in the form of a plug. These connection means 26 can be used to connect the foot rest 1 to an electrical on-board power supply system (not illustrated here) of the motor vehicle. Depending on the connecting option in the vehicle, the foot rest 1 can therefore be arranged in any desired footwell 10. If, for example, heating of the foot-depositing board 4 and/or of the air entering into the footwell through the foot-depositing board 4 is desired, there can be installed in the foot-depositing board 4 an electrical heating element 30 which is likewise connected via the electrical connection 26 to the on-board power supply system of the vehicle.

In the embodiment according to FIG. 2, the air-inlet opening 14' can be connected via an adapter 27, which is connected to the air-inlet opening 14', for example, via a rubber expansion sleeve 28, to an air discharge 29 of an air-conditioning device (otherwise not illustrated) of the motor vehicle. This embodiment of the foot rest 1 is particularly suitable for a fixed, i.e. permanent installation in the footwell 10 of the vehicle. The ventilation of the storage space 5 and of the foot-depositing board 4 can be carried out with conditioned air via the air-conditioning device of the vehicle.

Diverse operating elements, for example a switch or a push-button 31, can be formed on the upper side of the housing 2, in order to switch on the heating element 30, the fan 25 and the flaps 21 and 23, for example.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. A ventilated foot rest for a motor vehicle comprising:
   a housing mounted on a floor of the motor vehicle which contains at least one air-inlet opening and at least one air-outlet opening, and
   a foot-depositing board on an upper side of the housing,
   wherein a storage space is formed in the housing, and
   wherein at least two flow paths, which are independent of each other, are formed in the housing, a first flow path ventilating the storage space, and a second flow path bypassing the storage space and ventilating the foot-depositing board.

2. The foot rest according to claim 1, wherein the foot-depositing board is formed on a cover of the storage space, and wherein the second flow path at least partly runs in the cover.

3. The foot rest according to claim 1, wherein a common air-intake space is provided for the flow paths, wherein the at least one air-inlet opening opens into the common air-intake space, and wherein the common air-intake space contains a separate overflow opening for each flow path, a first overflow opening forming the inlet into the first flow path and a second overflow opening forming the inlet into the second flow path.

4. The foot rest according to claim 3, and further comprising flap means which can be used to set the cross section, through which the flow can pass, of the first overflow opening, of the second overflow opening, or of the first and second overflow openings.

5. The foot rest according to claim 1, wherein said at least one air-outlet opening is one of a plurality of air-outlet openings, and wherein one of the air-outlet openings is formed in a wall section of the housing, which wall section bounds the storage space.

6. The foot rest according to claim 1, wherein said at least one air-outlet opening is one of a plurality of air-outlet openings, and wherein one of the air-outlet openings is formed in the foot-depositing board.

7. The foot rest according to claim 6, wherein the air-outlet opening of the foot-depositing board is formed by a multiplicity of small openings which are distributed extensively over the foot-depositing board.

8. The foot rest according to claim 3, and further comprising a fan arranged in the air-intake space which sucks in fresh air at the at least one air-inlet opening and feeds it to each overflow opening.

9. The foot rest according to claim 8, and further comprising electrical connection means provided on the housing which can be used to connect the foot rest to an electrical on-board power supply system of the motor vehicle.

10. The foot rest according to claim 1, wherein the at least one air-inlet opening is connected to an air discharge of an air-conditioning device of the motor vehicle.

11. The foot rest according to claim 1, wherein the at least one air-inlet opening has an adapter with which the air-inlet opening can be connected to an air discharge of an air-conditioning device of the motor vehicle.

12. The foot rest according to claim 1, wherein the foot-depositing board has at least one electrical heating element.

13. The foot rest according to claim 1, wherein the motor vehicle is a passenger vehicle.

14. A ventilated foot rest for a motor vehicle comprising:
   a housing which contains at least one air-inlet opening and at least one air-outlet opening,
   a foot-depositing board on an upper side of the housing,
   wherein a storage space is formed in the housing,
   wherein at least two flow paths, which are independent of each other, are formed in the housing, a first flow path ventilating the storage space, and a second flow path bypassing the storage space and ventilating the foot-depositing board,
   wherein said at least one air-outlet opening is one of a plurality of air-outlet openings, and
   wherein one of the air-outlet openings is formed in a wall section of the housing, which wall section bounds the storage space, and
   an odor filter arranged in the air-outlet opening of the storage space.

15. The foot rest according to claim 14, wherein the odor filter is an activated carbon filter.

16. A process for ventilating a foot rest for a motor vehicle which includes a housing mounted on a floor of the motor vehicle, containing at least one air-inlet opening, having at least one air-outlet opening, having a foot-depositing board on its upper side, and forming a storage space therein, comprising:
   forming a first flow path ventilating the storage space, and
   forming a second flow path which is independent of the first flow path, bypasses the storage space, and ventilates the foot-depositing board, so as to ventilate the foot rest.

17. The process according to claim 16, wherein the foot-depositing board is formed on a cover of the storage space, and wherein the second flow path at least partly runs in the cover.

18. The process according to claim 16, wherein a common air-intake space is provided for the flow paths, wherein the at least one air-inlet opening opens into the common air-intake space, and wherein the common air-intake space contains a separate overflow opening for each flow path, a first overflow opening forming the inlet into the first flow path and a second overflow opening forming the inlet into the second flow path.

19. The process according to claim 18, wherein flap means can be used to set the cross section, through which the flow can pass, of the first overflow opening, of the second overflow opening, or of the first and second overflow openings.

20. The process according to claim 16, wherein said at least one air-outlet opening is one of a plurality of air-outlet openings, and wherein one of the air-outlet openings is formed in a wall section of the housing, which wall section bounds the storage space.

21. The process according to claim 16, wherein said at least one air-outlet opening is one of a plurality of air-outlet openings, and wherein one of the air-outlet openings is formed in the foot-depositing board.

22. The process according to claim 21, wherein the air-outlet opening of the foot-depositing board is formed by a multiplicity of small openings which are distributed extensively over the foot-depositing board.

23. The process according to claim 18, wherein a fan is arranged in the air-intake space which sucks in fresh air at the at least one air-inlet opening and feeds it to each overflow opening.

24. The process according to claim 23, wherein electrical connection means are provided on the housing which can be used to connect the foot rest to an electrical on-board power supply system of the motor vehicle.

25. The process according to claim 16, wherein the at least one air-inlet opening is connected to an air discharge of an air-conditioning device of the motor vehicle.

26. The process according to claim 16, wherein the at least one air-inlet opening has an adapter with which the air-inlet opening can be connected to an air discharge of an air-conditioning device of the motor vehicle.

27. The process according to claim 16, wherein the foot-depositing board has at least one electrical heating element.

28. The process according to claim 16, wherein the motor vehicle is a passenger vehicle.

29. A process for ventilating a foot rest for a motor vehicle which includes a housing containing at least one air-inlet opening, having at least one air-outlet opening, having a foot-depositing board on its upper side, and forming a storage space therein, comprising:

forming a first flow path ventilating the storage space, and forming a second flow path which is independent of the first flow path, bypasses the storage space, and ventilates the foot-depositing board, so as to ventilate the foot rest, wherein said at least one air-outlet opening is one of a plurality of air-outlet openings, wherein one of the air-outlet openings is formed in a wall section of the housing, which wall section bounds the storage space, and wherein an odor filter is arranged in the air-outlet opening of the storage space.

30. The process according to claim 29, wherein the odor filter is an activated carbon filter.

* * * * *